(12) United States Patent
Staley et al.

(10) Patent No.: US 11,947,904 B2
(45) Date of Patent: Apr. 2, 2024

(54) SYSTEM AND METHOD FOR COMPLETING MULTIPLE ELECTRONIC FORMS

(71) Applicant: Quick Click E-Forms, LLC, Olympia, WA (US)

(72) Inventors: Mark Staley, Olympia, WA (US); Jesse Kinney, Fircrest, WA (US)

(73) Assignee: Quick Click E-Forms, LLC, Lorena, TX (US)

( * ) Notice: Subject to any disclaimer, the term of this patent is extended or adjusted under 35 U.S.C. 154(b) by 0 days.

(21) Appl. No.: 17/169,247

(22) Filed: Feb. 5, 2021

(65) Prior Publication Data
US 2022/0253595 A1 Aug. 11, 2022

(51) Int. Cl.
*G06F 40/174* (2020.01)
*G06F 16/93* (2019.01)

(52) U.S. Cl.
CPC ............ *G06F 40/174* (2020.01); *G06F 16/93* (2019.01)

(58) Field of Classification Search
CPC .............................. G06F 40/174; G06F 16/93
See application file for complete search history.

(56) References Cited

U.S. PATENT DOCUMENTS

| | | | | |
|---|---|---|---|---|
| 7,418,656 B1* | 8/2008 | Petersen | ............... | G06F 40/169 715/230 |
| 2004/0268229 A1* | 12/2004 | Paoli | ..................... | G06F 40/174 715/234 |
| 2005/0198563 A1* | 9/2005 | Kristjansson | ......... | G06F 40/174 715/224 |
| 2007/0256005 A1* | 11/2007 | Schneider | ............. | G06F 40/134 |
| 2015/0205777 A1* | 7/2015 | Campanelli | ........ | G06K 9/00449 715/226 |
| 2016/0314109 A1* | 10/2016 | Singh | ..................... | G06F 40/131 |
| 2016/0335239 A1* | 11/2016 | Brown | .................. | G06F 40/174 |
| 2018/0324105 A1* | 11/2018 | Gillon | ..................... | H04L 47/74 |
| 2019/0213242 A1* | 7/2019 | Pathak | .................. | G06F 40/174 |

* cited by examiner

*Primary Examiner* — Kyle R Stork

(57) ABSTRACT

A system and method for completing fillable electronic forms. One exemplary technique involves automatically importing one or more fillable electronic forms from a database, receiving, at a user interface component via a network, a request to select the one or more fillable electronic forms, presenting a set of selectable fillable form fields from the one or more fillable electronic forms, presenting the one or more fillable electronic forms, receiving a user response for populating one or more fillable form fields from the set of selectable fillable form fields, and automatically deploying the user response in a second and subsequent fillable electronic form from the one or more fillable electronic forms, the second fillable electronic form having one or more fillable form fields shared in common with the one or more fillable form fields from the set of selectable fillable form fields.

15 Claims, 9 Drawing Sheets

SYSTEM AND METHOD FOR COMPLETING MULTIPLE ELECTRONIC FORMS

BACKGROUND

Converting forms to fillable electronic forms from paper or existing electronic files, such as Microsoft Word files is a common way for enterprises to reduce paper consumption and continue to endeavor doing business the paper-less way. Today, many organizations are continually undergoing the digital transformation and are looking for efficient ways to collect and process information from their customers or end-users. Furthermore, newly created integration tools and case management systems are built to drive the very underpinnings of doing business with fillable electronic forms, rather than paper.

Although paper may one day in the future become the exception, the ability to automate manual processes and collect information using both paper and electronic forms, as well as manage the onward processing of that information within a single solution makes good sense. Today, paper intensive or manual processes are good candidates for automation with feature-rich, electronic forms.

Existing techniques for automation can require the source form document to contain explicit definitions of each form field so that the computer can suggest appropriate input data based on form field attributes and user information or prior field values. Programs for upgrading paper forms to electronic forms can automatically recognize and convert static fields to fillable ones. These fillable and interactive form fields can be inspected in a fields panel, for example, in which the field names may be changed or edited. Additionally, some of these existing form filling techniques must match the explicit definitions to previous forms or data. The user will be required to visually ensure that the form they are completing is identical to their paper-based form document.

Cooperation between different form vendors and the application program is needed when the source form documents come from different types of documents or different vendors. As such, the existing form filling techniques cannot be used with electronic forms having undefined form fields or where the form field definitions are not consistent between different forms. If the application program does not generate a perfect copy of the form document but instead independently creates, for example, a portable document format form for completion, these independently created forms may not be true to the original and may be outdated or of another variation of the form.

In a digital environment, the process of completing forms can be defined, but the process itself comprises nuance because of the subjective intricacies of any single form and how that form may relate to or compliment multiple forms that accompany its completion. While some vendors are focused on recreating forms as electronic forms, more and more enterprises are seeking reliance on electronic forms that have been constructed from tried and true paper-based documents.

SUMMARY

An exemplary embodiment involves memory, having processor readable code stored therein; at least one database storing a plurality of fillable electronic forms intended for data input; and one or more processors communicatively coupled to the memory and configured to execute instructions in the processor readable code that cause the one or more processors to: automatically importing one or more fillable electronic forms from a database, receiving, at a user interface component via a network, a request to select the one or more fillable electronic forms, present a set of selectable fillable form fields from the one or more fillable electronic forms, present the one or more fillable electronic forms, receive a user response for populating one or more fillable form fields from the set of selectable fillable form fields, and automatically deploy the user response a second and subsequent fillable electronic form from the one or more fillable electronic forms, the second fillable electronic form having one or more fillable form fields shared in common with the one or more fillable form fields from the set of selectable fillable form fields Another exemplary embodiment involves at least one non-transitory computer readable medium containing processor readable code for programming one or more processors to perform a method comprising: automatically importing, over a network, one or more of a plurality of fillable electronic forms from at least one database; receiving, at a user interface component via the network, a request to select the one or more of the plurality of fillable electronic forms; presenting a set of selectable fillable form fields from the one or more of the plurality of fillable electronic forms; presenting the one or more of the plurality of fillable electronic forms; receiving a user response for populating one or more fillable form fields from the set of selectable fillable form fields; and automatically deploying the user response in at least a second fillable electronic form from the one or more of the plurality of fillable electronic forms, the at least a second fillable electronic form having one or more fillable form fields shared in common with the one or more fillable form fields from the set of selectable fillable form fields.

Yet another exemplary embodiment involves a non-transitory computer readable medium storing instructions executable by at least one processing device, the instructions including instructions to: automatically import, over a network, one or more of the plurality of fillable electronic forms from the at least one database; receive, at a user interface component via the network, a request to select the one or more of the plurality of fillable electronic forms; present a set of selectable fillable form fields from the one or more of the plurality of fillable electronic forms; present the one or more of the plurality of fillable electronic forms; receive a user response for populating one or more fillable form fields from the set of selectable fillable form fields; and automatically deploy the user response in at least a second fillable electronic form from the one or more of the plurality of fillable electronic forms, the at least a second fillable electronic form having one or more fillable form fields shared in common with the one or more fillable form fields from the set of selectable fillable form fields.

Naturally, further objects of embodiments are disclosed throughout other areas of the specification, drawings, photographs, and claims.

BRIEF DESCRIPTION OF THE DRAWINGS

Corresponding reference numerals indicate corresponding parts throughout the several views of the drawings.

FIG. 3A is a graphical display of the user interface of the system, in accordance with implementations of the present disclosure;

FIG. 3B illustrates another graphical display of the user interface of the system, in accordance with implementations of the present disclosure;

FIG. 4 is a graphical display of the user interface for completing an electronic form, in accordance with implementations of the present disclosure;

FIG. 5 illustrates an embodiment of the system for inputting data in fillable form fields of the graphical display, in accordance with implementations of the present disclosure;

FIG. 6 illustrates a graphical display having more than one electronic form for completion, in accordance with implementations of the present disclosure;

FIG. 8 is another graphical display of the user interface of the system having more than one electronic form for completion, in accordance with implementations of the present disclosure.

Figure 1:
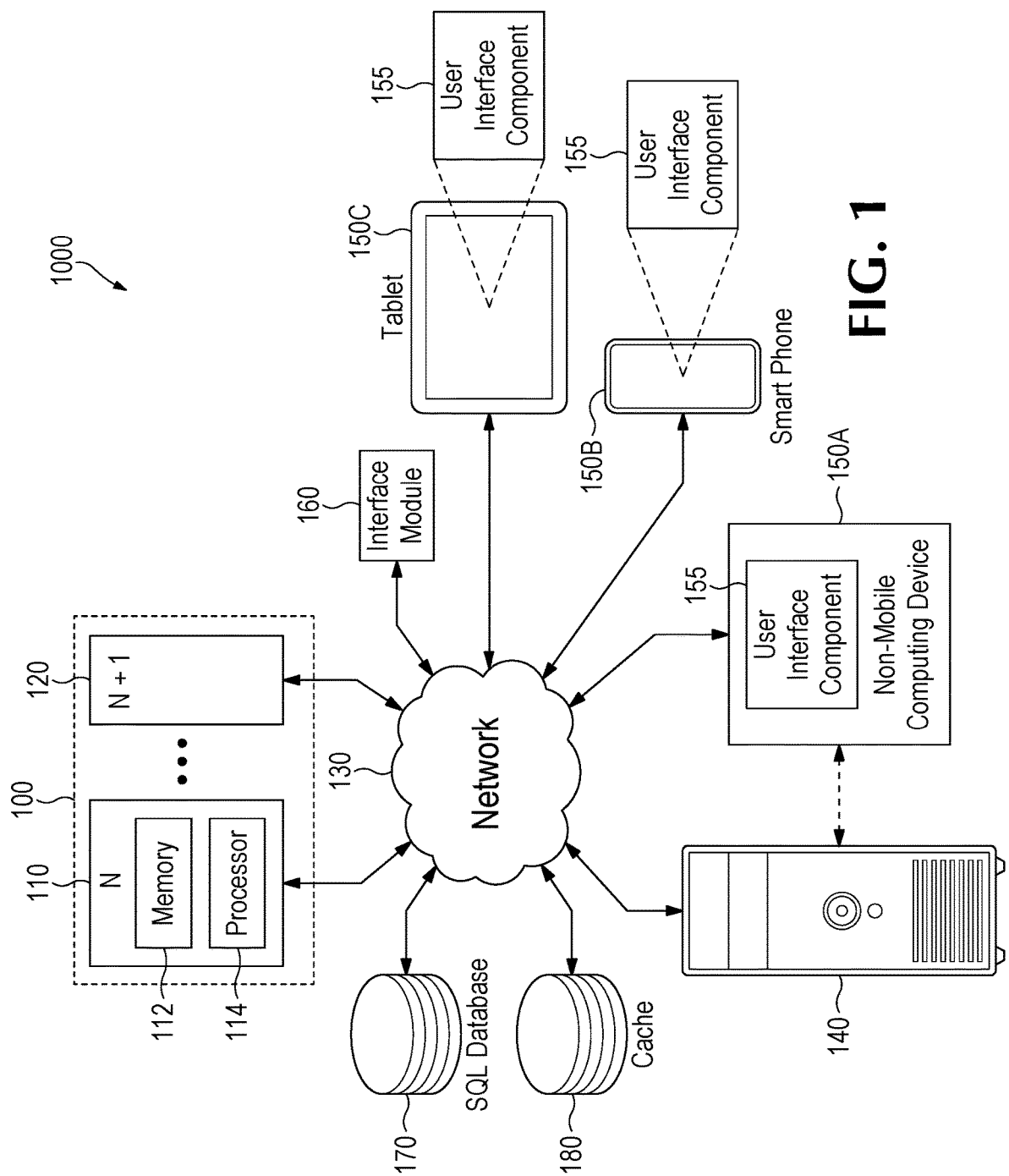
FIG. 1 is a schematic view of a system for completing an electronic form or multiple electronic forms, in accordance with implementations of the present disclosure.

The drawings described herein are for illustrative purposes only of select embodiments and not all possible implementations, and are not intended to limit the scope of the present disclosure.

DETAILED DESCRIPTION

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation. Moreover, it is to be appreciated that the drawings may not be to scale.

According to embodiments of the present disclosure, an electronic form completion system 1000 relates to systems and methods for completing electronic forms having multiple form fields. Embodiments of the present disclosure may be implemented using a general-purpose computer. Alternatively, a special-purpose computer may be built using suitable logic elements. Additional embodiments of the present disclosure may be deployed and implemented as a web-based platform. Further embodiments of the present disclosure may be integrated with work flow engines, content management systems, and enterprise content management systems.

As used in the present disclosure, the term "electronic form" refers to a form document that resembles the appearance of a paper-based form while allowing data to be entered into the form using a computer. The document generally, can be in any format or medium that can be preserved and represented. By way of example, an electronic form can, but not necessarily, be a document that contains at least one field for completion by the user, or a more complex government or court document for processing that, when otherwise paper-based, would meet strict rules in its naming scheme, the time with which it takes to complete, and its margins, formatting, layout, for example. Additionally, the form document or source document, used to spawn an electronic form, as defined in this paragraph, can be a physical, printed copy (hardcopy) of the document or a digital copy of the document, or in the alternative, it can be an electronic file containing text, structure, design, fonts, colors, and/or images. The form document may be publicly available via a form repository, privately available, secured (requiring computer authentication prior to display) or unsecured, and it may be a copy or an original. The form document's file format can be a render-based file format such as, Portable Document Format or PDF document which is an open standard format released by Adobe, Incorporated, or a Microsoft Word or Excel document which too, is an open standard format and generally creatable, editable, viewable, etc. via Microsoft Corporation's software. Other examples of file format can, but not necessarily, include image-based file formats, such as PNG, TIF, GIF, JPG, and BMP. In the case of image-based formats, because text is not rendered and is only distinguished visually, optical character recognition (OCR) technology may be used along with pre-processing to detect lines and other graphic patterns. Once the text and graphic elements are obtained from the image pre-processing, an electronic form generated therefrom can be processed in a similar manner to a render-based format, such as PDF, Word, Excel, or other suitable format.

As used in the present disclosure, the term "form document" refers to the blank form document as input by the user, the captured image thereof, the digitally recreated form document, necessary accompanying documents for the form document, the completed form document, and the like.

As used in the present disclosure, the term "fillable form field" refers to a region of an electronic form where data can be entered by a user. A form field can include a region for entering text, values, or other markings, such as a checkmark or "X" in a box, a bullet symbol in a radio button, or a digitized handwritten signature in a signature block.

In the present disclosure, illustrative examples of electronic forms sourced from sample state court family law/domestic law form documents and federal grant applications are disclosed, but the technology of the present disclosure is not limited to those uses, data types, or industries, as the electronic form completion techniques disclosed are intended to be used for varying applications.

With reference to FIG. 1, system 1000 includes one or a series (1-n) of hosted servers 100 connected by a Network 130 generally to Data Sources 140; Computing Devices 150A,B,C; Interface Module 160; and one or more Databases 170 and 180. While two servers (110, 120) of the hosted servers 100 are shown in FIG. 1, embodiments of the system 1000 are not limited by the number of hosted servers 100. The illustrative example of the hosted servers 100 of the system 1000 is not intended to preclude embodiments which incorporate similar or equivalent single or multiple blade servers and server farms.

Server N 110 and server N+1 120 of the series (1-n) of hosted servers 100 include Memory 112 and Processor 114. The Memory 112 holds instructions in processor-readable code used by the Processor 114. The Processor 114 can be communicatively coupled to the Memory 112 and configured to execute the instructions in the processor-readable code. Server N 110 and server N+1 120 of the series (1-n) of hosted servers 100 can include more than one Memory 112 and more than one Processor 114. The hosted servers 100 are adapted to execute computer programmable logic used to provide specified functionality. The computer programmable logic can be implemented in hardware, firmware, and/or software.

With continuing reference to FIG. 1, Network 130 provides a communication infrastructure for system 1000. The Network 130 is typically the Internet, but may be any network, including but not limited to a Local Area Network (LAN), a Metropolitan Area Network (MAN), a Wide Area Network (WAN), a mobile wired or wireless network, a private network, or a virtual private network. Traffic on the Network 130 can, but not necessarily, be secured using encryption such as by SSL or IPsec.

Data Sources 140 is a computing device which can, but not necessarily, include software that allows storage and retrieval of the enterprise organization's data. Data Sources 140 is in communication with other computing devices such as user Computing Devices 150 through Network 130 and can, but not necessarily, be hard-wired, for example, to a non-mobile computing device 150A, such as a work station.

Computing Devices 150A, 150B, 150C are connected through Network 130 and can be any computing device including a processor and memory, such as a personal computer, workstation, server, portable computer, mobile phone, personal digital assistant, laptop, smart phone, satellite phone, WAP phone, or a combination of these. Computing Devices 150A, 150B, 150C may include a software application, application plug-in (e.g., a widget), instant messaging application, mobile device application, e-mail application, online telephony application, java application, web page, or web object (e.g., a widget) residing or rendered on Computing Devices 150A, 150B, 150C in order to access and display system 1000 using network 130. The display of the system 1000 can, but not necessarily, be a monitor type device that is used to display information. Other input devices intended to be used with the system 1000 can, but not necessarily, be any device that allows for input, examples of which may include, but are not limited to, keyboards, touch screens, microphones, speakers, pointing devices, and peripheral devices, including but not limited to, printers, antenna, transceivers, and scanners.

Again, with continuing reference to FIG. 1, Computing Devices 150A, 150B, 150C can be configured to provide the display used to access User Interface Component 155 which is communicatively coupled to Interface Module 160 through the Network 130 to the hosted servers 100 of the system 1000. The illustrative example of the Interface Module 160 of system 1000 is not intended to preclude embodiments which incorporate similar or equivalent application program interfaces that define interactions between multiple software intermediaries.

Still, with continuing reference to FIG. 1, Database 170 can, but not necessarily, be private and secure data sources pertaining to, for example, an enterprise's form definition library. Database 170 can be a structured query language (SQL) database communicatively coupled to the hosted servers 100 via the Network 130. In various embodiments, the Database 170 can be a no structured query language, a key value store, and a MapReduce. Cache 180, as an additional database to Database 170 can be communicatively coupled to the hosted servers 100 via the Network 130. In various embodiments, Cache 180 can be in memory cache, distributed cache, and disk cache. The illustrative examples of the Database 170 and Cache 180 of system 1000 are not intended to preclude embodiments which incorporate similar or equivalent data managing languages and data storing media.

In an embodiment of the present disclosure, various external dependencies (not shown), as appropriate or as needed, can, but not necessarily, be included on system 1000. The external dependencies are not intended to preclude embodiments which incorporate similar or equivalent external dependency relationships with other additional service providers both commercially and prospectively available.

System 1000 can be implemented according to a client-server system, which can include a client-side portion executed on, for example, User Interface Component 155 of the Computing Devices 150A, 150B, 150C and a server-side portion executed on, for example, Data Sources 140, which is communicatively coupled to the hosted servers 100 of FIG. 1. The illustrative example of system 1000 is not intended to preclude embodiments, both commercially and prospectively available, which incorporate similar or equivalent backend architecture deployment types or combinations thereof, including XaaS, or otherwise DbaaS, IaaS, PaaS, SaaS, DaaS, and FaaS; monolith; microservices; and functions.

Figure 2:
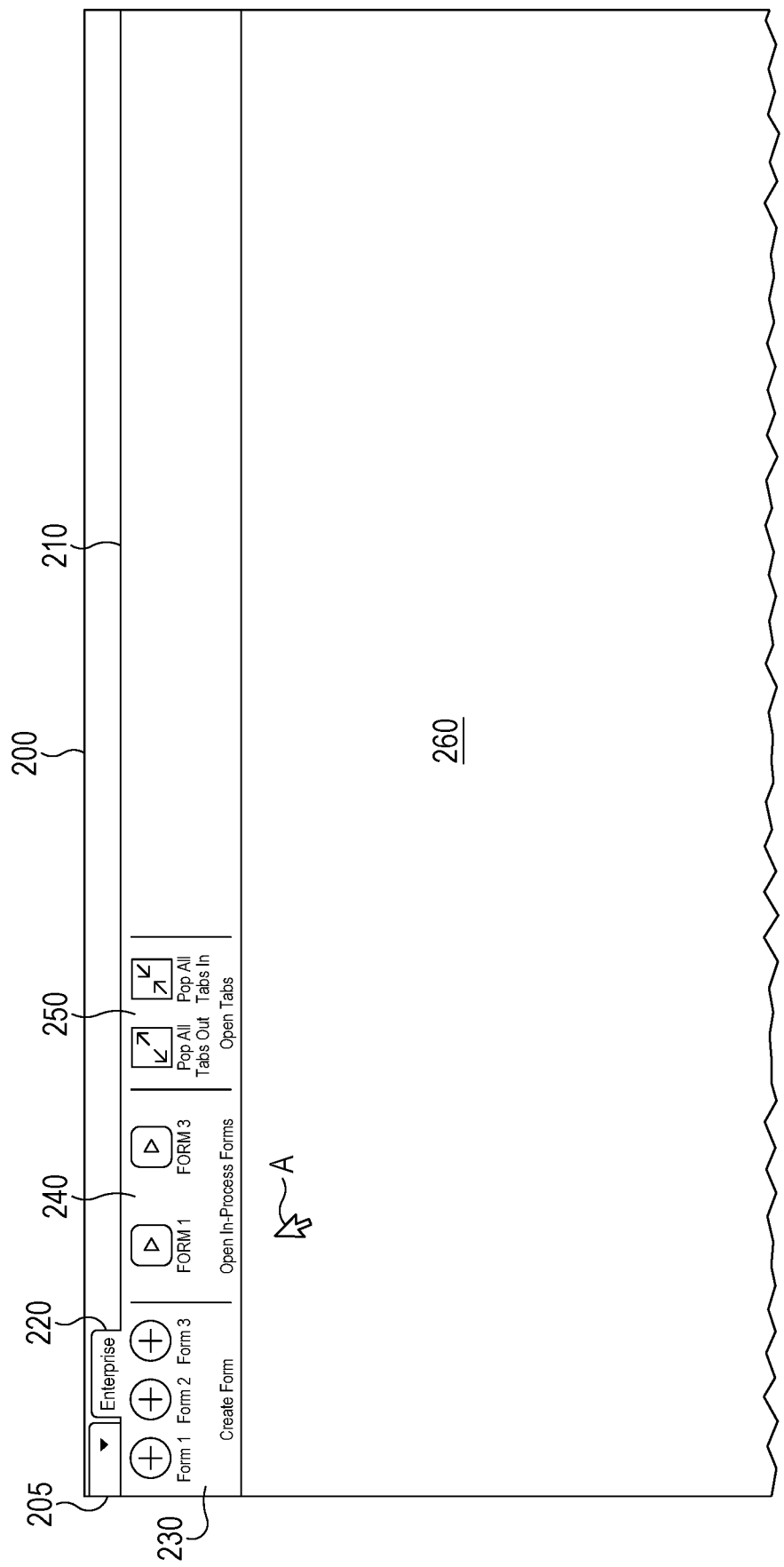
FIG. 2 illustrates a user interface of an embodiment of the system, in accordance with implementations of the present disclosure.

Referring now to FIG. 2 and with continuing reference to FIG. 1, a graphical display 200 of the User Interface Component 155 includes configurations to receive input data from and choice selections by a user. Menu tab 205 can include a dropdown menu for selecting control attributes. Graphical display 200 can, but not necessarily, be a viewer of the system 1000 in the style and format of Windows®, for example. The illustrative example of the graphical display 200 is not intended to preclude embodiments which incorporate similar or equivalent viewers, computer programs, and client applications both commercially and prospectively available.

In accordance with one or more embodiments of the present disclosure, graphical display 200 includes a display of tab content disposed in a tab row 210. The tab row 210 includes "Enterprise" tab 220 with which the user has permissions to access. "Enterprise" tab 220 can, but not necessarily, be custom built to tailor to a specific enterprise organization's forms. The tab row 210 refers to a designated display area that can display one or more tabs, one or more tab groups, and one or more tab controls for the display of and interaction with tab content. Although the illustrative example of FIG. 2 shows the tab row 210 in a horizontal layout, tab row 210 can, but not necessarily, display its tabs, tab groups, and tab controls in a variety of other layouts, (e.g., arranged vertically in a column fashion). In some embodiments, the tab row 210 may be displayed so that a user may visually discern the area comprising the tab row 210 from other areas of the graphical display 200.

With continuing reference to FIG. 2, user can move cursor A to open tab 220 displaying content 230 "Create Form" which provides, for example, tab content "Form 1", "Form 2", and "Form 3" along with "encircled plus signs" as functional graphics disposed above "Form 1", "Form 2", and "Form 3" for choice selection associated with multiple forms, (e.g., "Form 1", "Form 2", and "Form 3" and so on . . . ).

Tab content within tab row 210 of graphical display 200 can, but not necessarily, be segregated with dividing lines to distinguish tabs, tab groups, and tab controls. In one or more embodiments, the tab content of tab group 240 can be separated from "Create Form" tab group 230 of "Enterprise" tab 220. Tab group 240 can be used to designate "Open In-Process Forms" and associated functional graphics. Tab group 250 can designate "Open Tabs" and associated functional graphics for popping out a selected form from the designated form display area 260, which further allows the popped out form to be moved outside the confines of the graphical display 200. The illustrative examples of the functional graphics displayed within tab groups 230, 240, and 250 of tab 220 of system 1000 are not intended to preclude embodiments which incorporate similar or equivalent routines, subroutines, iterations, loops, and recursions both commercially and prospectively available.

Figure 3A:
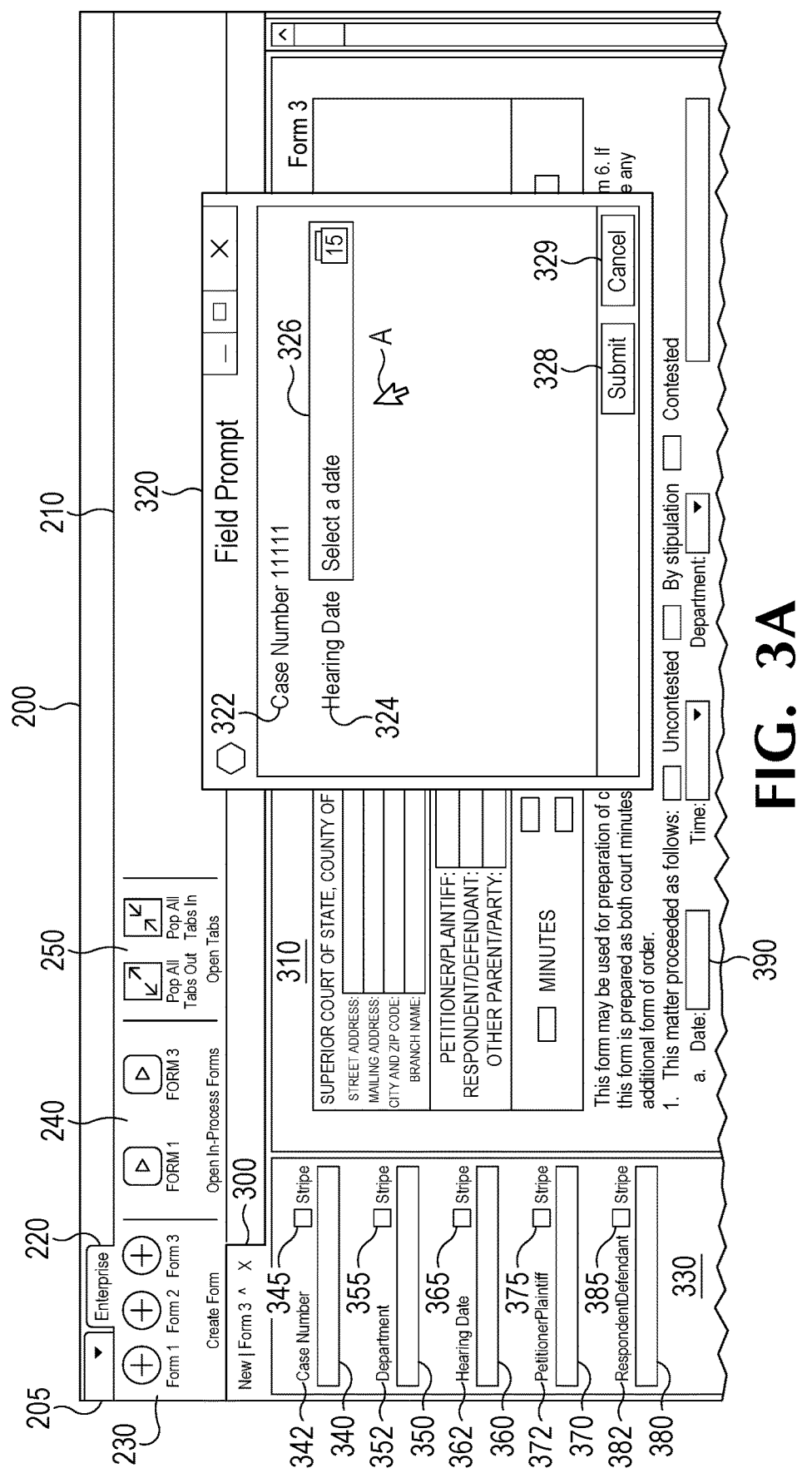
Figure 3B:
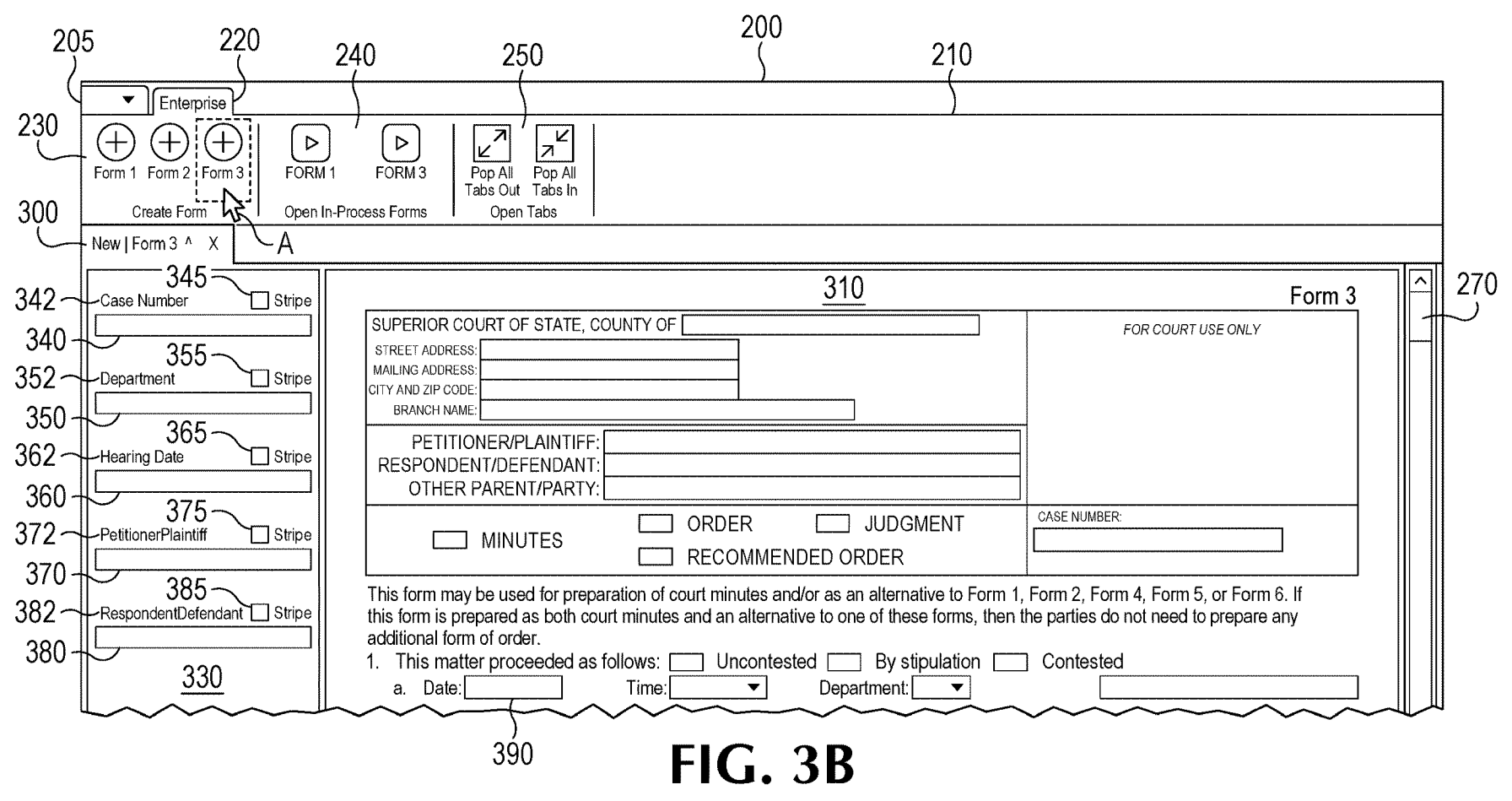

Referring to FIGS. 3A and 3B, user can select "Form 3" from tab group 230. "Form 3" as queued 300 and selected will then display in display area 260 as a model form, "Form 3" 310. "Form 3" 310, for example, can be scrolled down by using scroll bar 270. Specific or certain field names with a fillable form fields can be displayed next to the display area 260 instantiated by model "Form 3" 310 in Field Prompt window 320 and field panel 330.

In accordance with one or more embodiments of the present disclosure, user can, but not necessarily, be prompted to enter data and make a selection in "Field Prompt" window 320 for a predetermined parameter or data point pertaining to one or more fillable form fields within an electronic form and one or more replicated fillable form fields across multiple electronic forms. For example, in "Field Prompt" window 320 of FIG. 3A, "Case Number" 322 "11111" has been automatically predetermined to request that the user enter data for a "Hearing Date" 324 in fillable form field 326. In accordance with another embodiment, field panel 330 includes predetermined fillable form fields 340, 350, 360, 370, 380. For example, fillable form field 340 of FIGS. 3A and 3B includes "Case Number" heading 342 and accompanying "Stripe" checkbox 345; fillable form field 350 includes "Department" heading 352 and accompanying "Stripe" checkbox 355; fillable form field 360 includes "Hearing Date" heading 362 and accompanying "Stripe" checkbox 365; fillable form field 370 includes "Petitioner/Plaintiff" heading 372, and accompanying "Stripe" checkbox 375; and fillable form field 380 includes "Respondent/Defendant" heading 382, and accompanying "Stripe" checkbox 385 within field panel 330.

Figure 4:
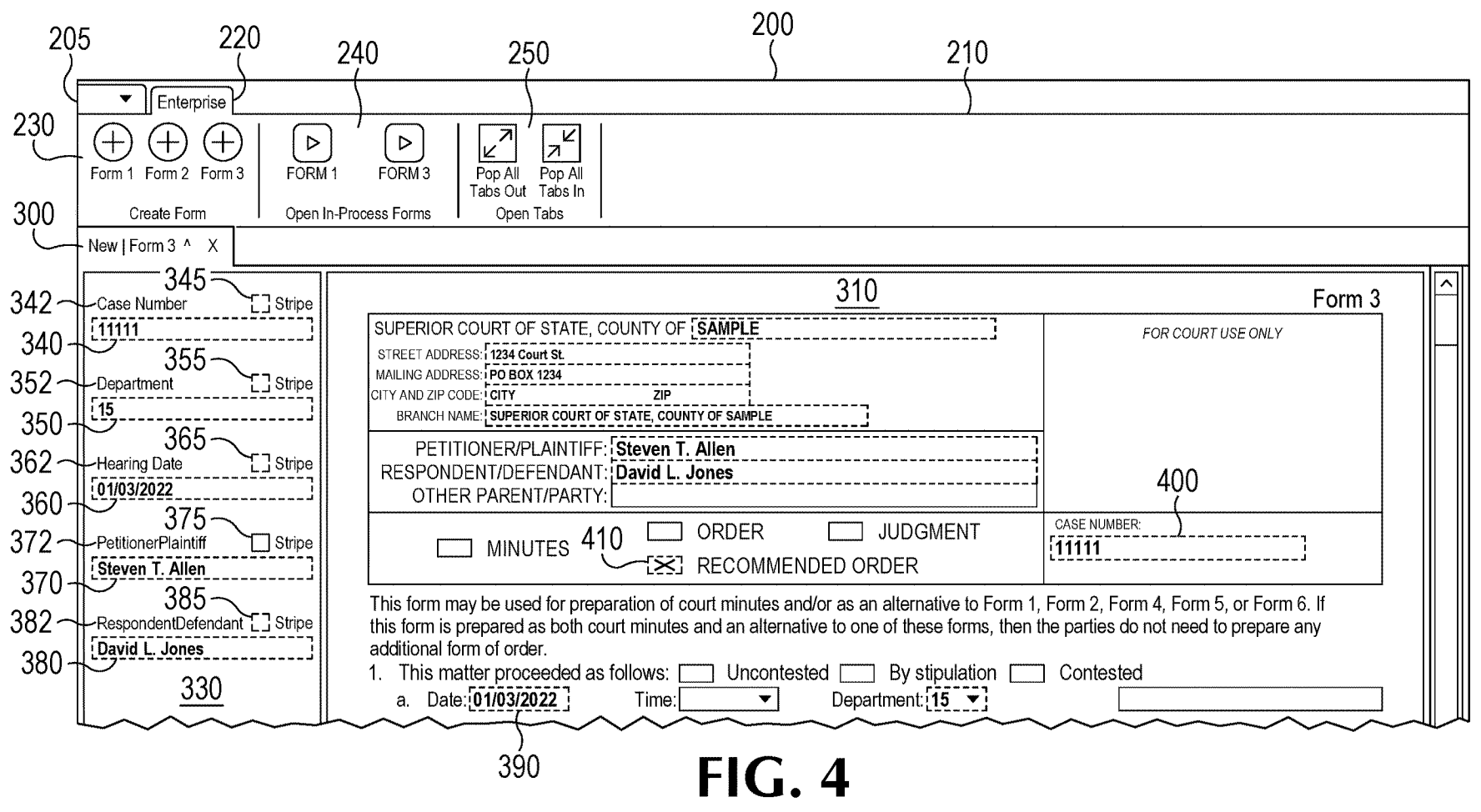

With reference to FIG. 4 and continuing reference to FIGS. 3A and 3B, user can be prompted to select a "Hearing Date" 324 in fillable form field 326 of "Field Prompt" window 320 through the use of cursor A. The date selected or the date of data entry input by the user will populate corresponding "Hearing Date" heading 362 of fillable form field 360 and the corresponding fillable form field "Date" 390 within electronic form 310 "Form 3" by clicking the "Submit" button 328. Any specific, single form field or any multiple form fields can be encoded to become automatically populated on the field panel 330 or throughout the electronic form "Form 3" 310 through the use of the Field Prompt window 320 feature, fillable form field 326. In accordance with another embodiment of the present disclosure, the user can click the "Cancel" button 329 to exit the Field Prompt window 320 feature, and instead, begin entering data input on the electronic form 310. For example, the user may move the cursor A to fillable form field 400 of electronic form 310 and enter "11111" resulting in an automatic population of "11111" into fillable form field 340 of the field panel 330. In another example, the user may move the cursor A to checkbox 410 "Recommended Order".

In accordance with one or more embodiments of the present disclosure, user can, for example, enter the date of "01/03/2022" in fillable form field 326 of "Field Prompt" window 320 for "Case Number" 322 "11111", then click "Submit" 328 to automatically populate fillable form field 360 of the field panel 330 and fillable form field 390 of the electronic form 310 with the date of "01/03/2022". A user, who may be quite familiar with an original form document, due to prior consistent usage of electronic form "Form 3" 310, can enter data input that is responsive to the form throughout various fillable form fields of electronic form "Form 3" 310, allowing the predesignated fillable form fields 340, 350, 360, 370, 380 which are correspondingly displayed in the field panel 330 to be automatically filled with duplicated data input. Thus, the data input is performed in a single entry on electronic form 310. In the alternative, the user can enter data input into each of the fillable form fields 340, 350, 360, 370, 380 within the field panel 330, allowing the data input to populate throughout the fillable form fields on electronic form "Form 3" 310, in which case, the data input is performed in a single entry on the field panel 330.

Figure 5:
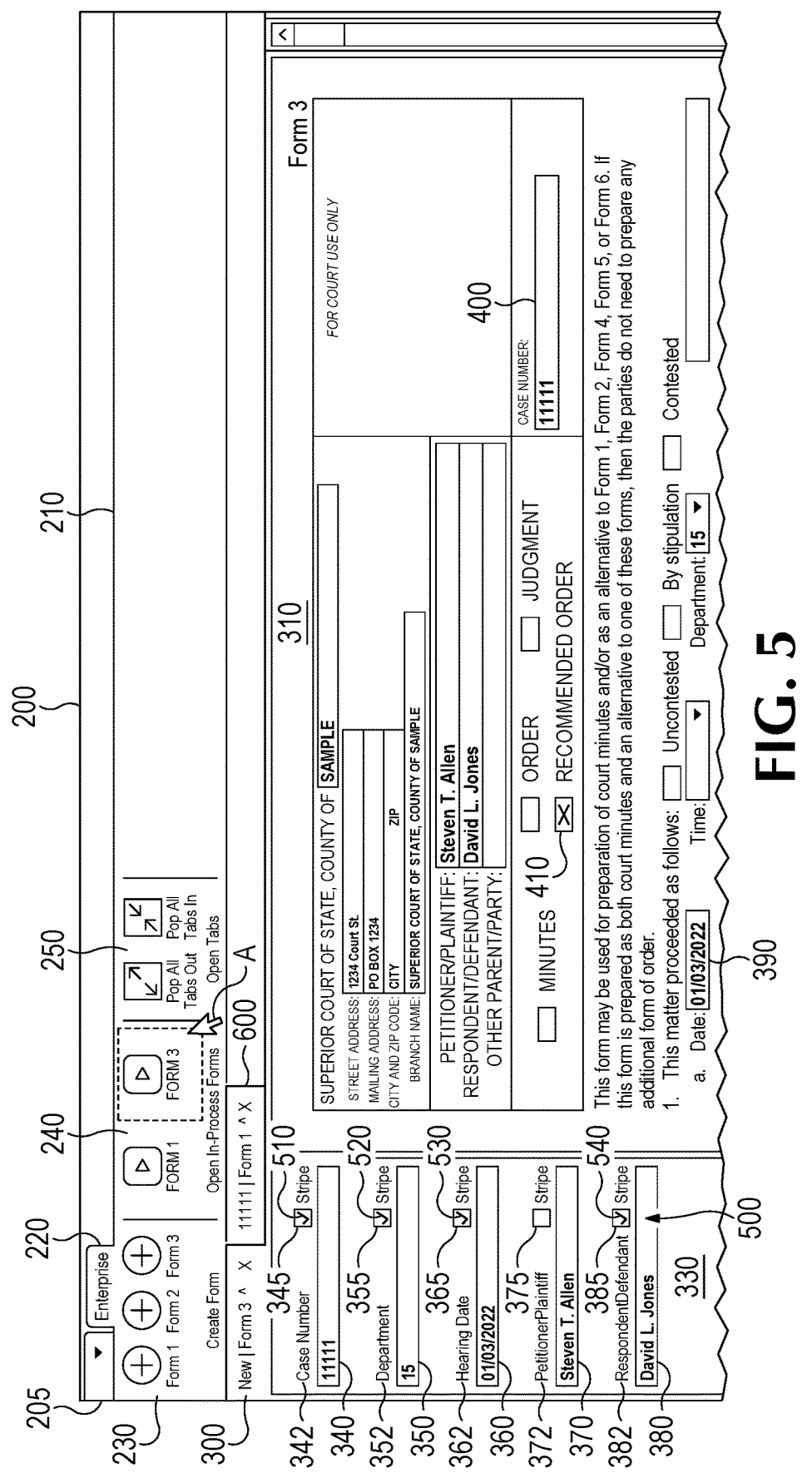
Figure 6:
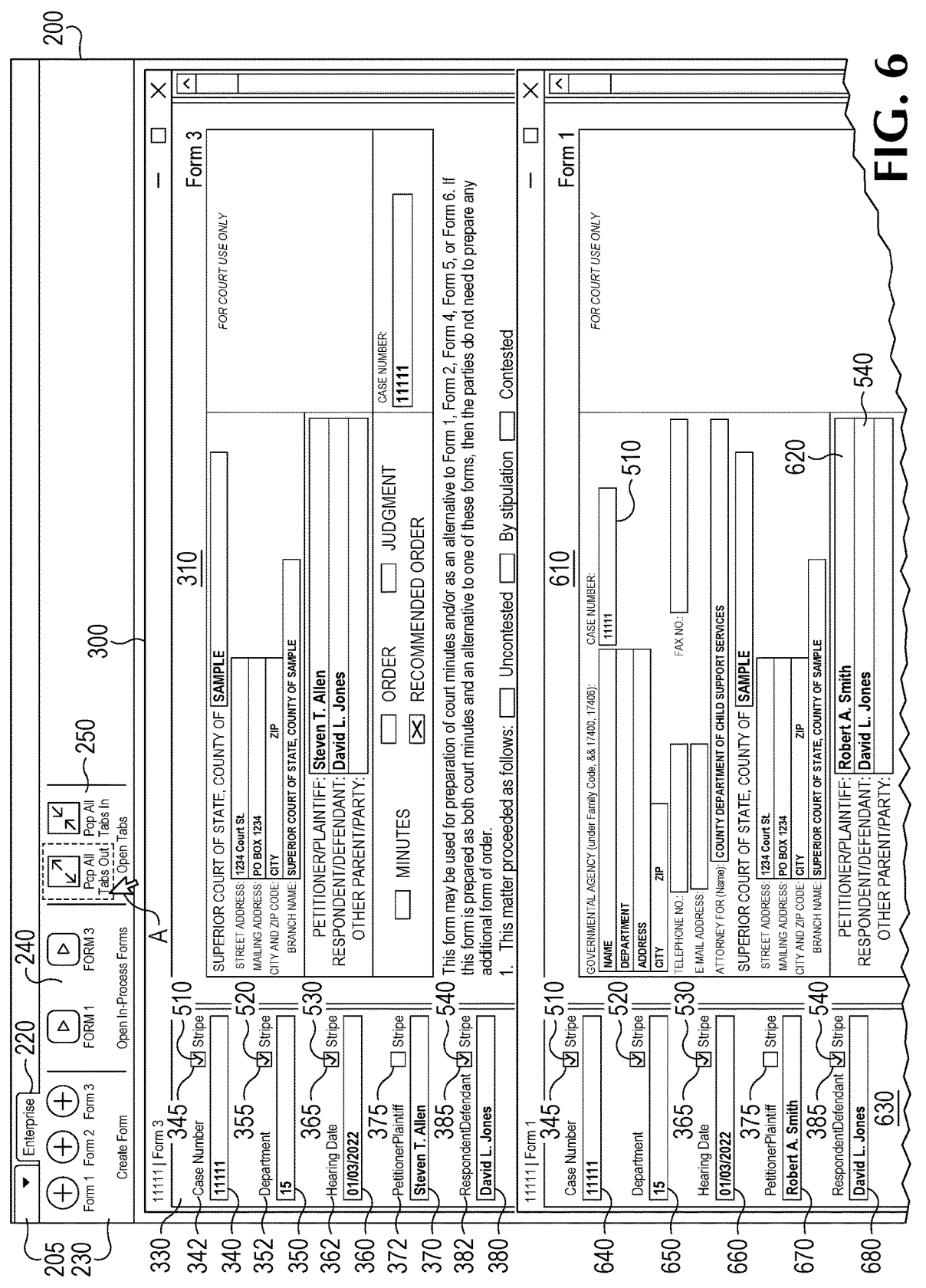

Referring now to FIGS. 5 and 6, the striping 500 feature of the system 1000 is illustrated. In FIG. 5, two separate forms are in the queue 300, 600 and deployed for form completion, in accordance with one or more embodiments of the present disclosure. "Form 3" 310 is instantiated with its corresponding field panel 330. "Stripe" checkboxes 345, 355, 365, 385 can be clicked to instantiate check marks 510, 520, 530, 540. "Stripe" checkbox 375 is purposely left empty or unchecked. In FIG. 6, "Form 1" 610 is displayed underneath "Form 3" 310. Fillable form field 620 on "Form 1" 610 has data input "Robert A. Smith", resulting in fillable form field 670 of the field panel 630 having been automatically populated with the same data input of "Robert A. Smith". Field panel 630 includes predetermined fillable form fields 640, 650, 660, 670, 680 which are labelled with the same headings as the fillable form fields 340, 350, 360, 370, 380 from field panel 330 of "Form 3" 310. Checkmarks 510, 520, 530, 540, are instantiated into field panel 630. The "Stripe" checkbox corresponding to fillable form field 670 is purposely left empty or unchecked. The result displayed includes the data input from the striped fillable form fields 340, 350, 360, 370, 380 of panel 330 striped across the second queued form, "Form 1" 610.

Figure 7:
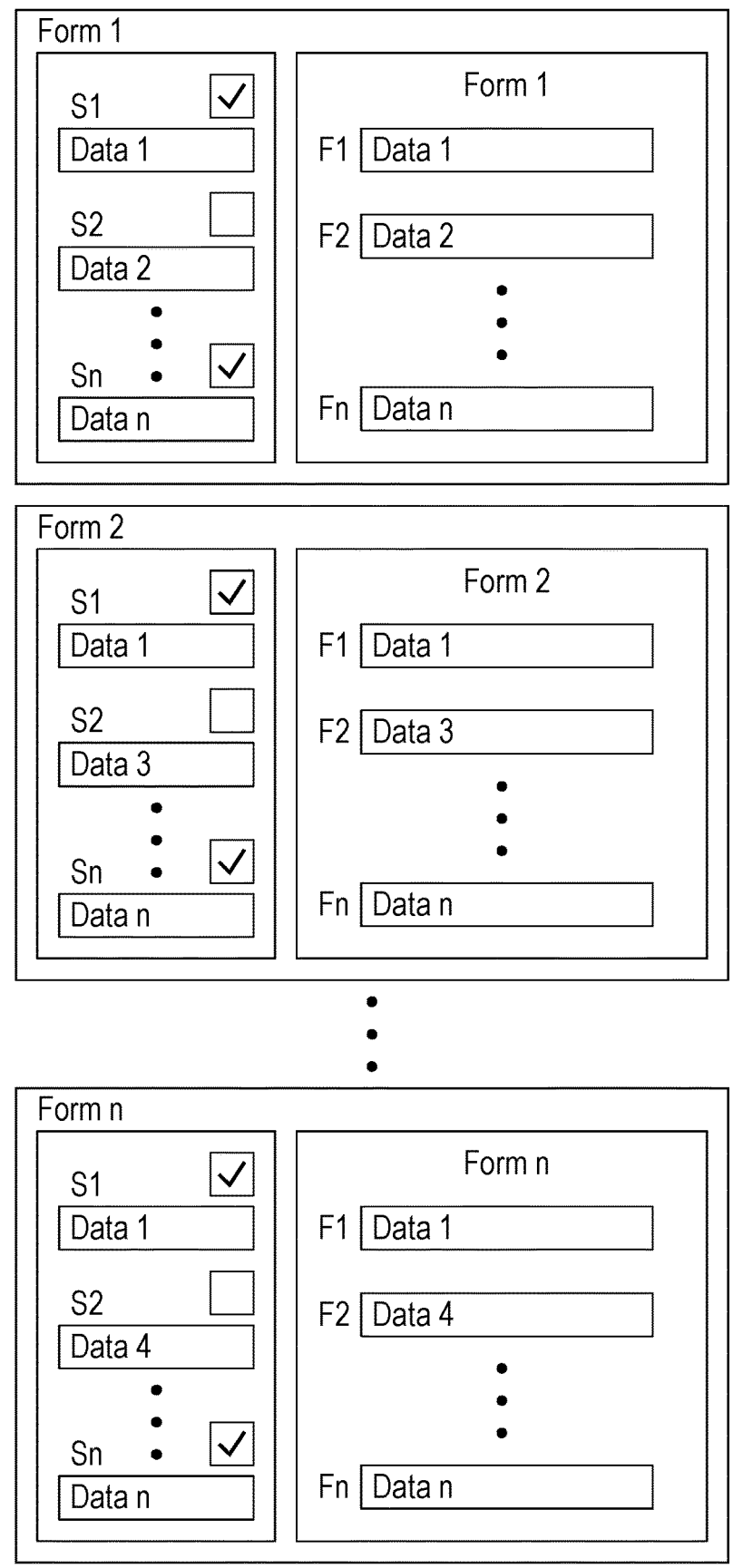
FIG. 7 is a diagram of an embodiment of data population between fillable form fields across multiple electronic forms, in accordance with implementations of the present disclosure.

With reference to FIG. 7, the attribute pattern for striping data input across multiple electronic forms is diagrammed 700. "Data 1" in "Form 1" populates within "Form 1", as well as, "Form 1's" accompanying field panel. "Data 1" is striped "S1" in "Form 1" and "Form 2" which results in "Data 1" populating the corresponding fillable form field within "Form 2". The process can be replicated for the remainder of the fillable form fields designated within and shared in-common between the field panels of diagram 700, resulting in multiple (n) forms with shared fillable form fields being completed automatically in the same instance.

Figure 8:
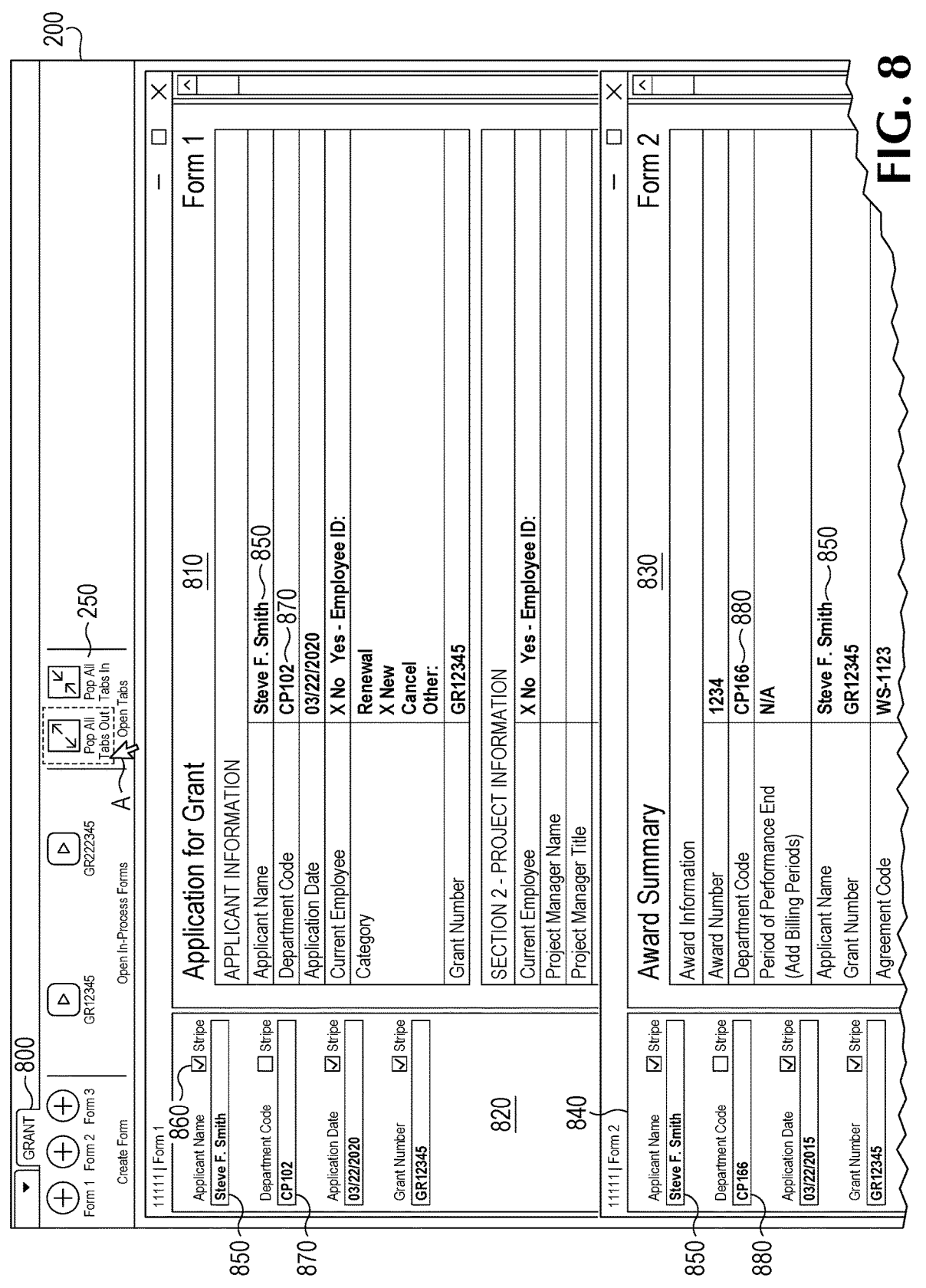

Referring now to FIG. 8, another "Grant" 800 is queued for deployment, in accordance with one or more embodiments of the present disclosure. "Form 1" 810 and "Form 2" 830 share common fillable form fields between each of their respective field panels 820, 840. A set of predetermined commonly shared fillable form fields is delineated in "Form 1" 810 and "Form 2's" 830 corresponding field panels 820, 840. Data striping for completing the forms 810, 830 allows "Steven F. Smith" 850 populated throughout both "Form 1" 810 and "Form 2" 830 in the appropriate fillable form fields 850 of both "Form 1" 810 and "Form 2" 830 while "CP102" 870 and "CP166" 880 are intended to be separate data input entries and therefore, not striped for repetition within fillable form fields 870, 880 across multiple forms.

In accordance with one or more embodiments of the present disclosure, system 1000 can, but not necessarily, include additional attributes and features, such as a wet ink panel for signature fillable form fields and user alerts viewable and displayed within the queue.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, Ultra HD Blu-ray, or other optical drive media.

The description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used is for the purpose of describing particular example embodiments only and is not intended to be limiting. The singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section could be termed a second element, component, region, layer or section without departing from the teachings of the example embodiments.

Spatially relative terms, such as "inner," "outer," "beneath," "below," "lower," "above," "upper," and the like, may be used for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It is understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, quadrants, thirds, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims. All references recited herein are incorporated herein by specific reference in their entirety.

What is claimed is:

1. A computer system, comprising:
    memory, having processor readable code stored therein;
    at least one database storing a plurality of fillable electronic forms which correspond to various form documents intended for data input; and
    one or more processors communicatively coupled to the memory and configured to execute instructions in the processor readable code that cause the one or more processors to:
        automatically import, over a network, one or more of the plurality of fillable electronic forms from the at least one database;
        receive, at a user interface component via the network, a request to select the one or more of the plurality of fillable electronic forms;
        present a set of selectable fillable form fields, wherein the set of selectable fillable form fields comprises a curated list of one or more fillable form fields which originate from the one or more of the plurality of fillable electronic forms that correspond to the various form documents, the curated list of one or more fillable form fields established in advance of presentment of the set of selectable fillable form fields;
        present the one or more of the plurality of fillable electronic forms; wherein each of the one or more plurality of fillable electronic forms are presented in entirety;
        receive a user response for populating one or more fillable form fields from the curated list of one or more fillable form fields of the set of selectable fillable form fields;
        stripe the user response as an identical response to be automatically deployed in at least a second fillable electronic form;
        automatically deploy the user response in at least a second fillable electronic form from the one or more of the plurality of fillable electronic forms, the at least a second fillable electronic form having one or more fillable form fields shared in common with the one or more fillable form fields from the curated list of one or more fillable form fields of the set of selectable fillable form fields,
        in response to the request to select the one or more of the plurality of fillable electronic forms, present multiple fillable electronic forms separately fillable from one another and separately fillable from the set of selectable fillable form fields, wherein the identical response selectively striped across the one or more fillable form fields, the set of selectable fillable form fields, and the multiple fillable electronic forms.

2. The system of claim 1, wherein in response to the selection of the one or more fillable fields comprises generating a field prompt to present the one or more fillable fields.

3. The system of claim 1, wherein in response to the selection of the one or more fillable fields comprises generating a field panel to present the one or more fillable fields.

4. The system of claim 1, further comprising:
    receive another user response for populating one or more fillable form fields from the one or more of the plurality of fillable electronic forms.

5. The system of claim 1, wherein the various form documents comprise a blank form document as input by any user, a captured image thereof, a digitally recreated form document, necessary accompanying documents for any of the various form documents, or a completed form document.

6. At least one non-transitory computer readable medium containing processor readable code for programming one or more processors to perform a method comprising:
    automatically importing, over a network, one or more of a plurality of fillable electronic forms which correspond to various form documents from at least one database;
    receiving, at a user interface component via the network, a request to select the one or more of the plurality of fillable electronic forms;
    presenting a set of selectable fillable form fields, wherein the set of selectable fillable form fields comprises a curated list of one or more fillable form fields which originate from the one or more of the plurality of fillable electronic forms that correspond to the various form documents, the curated list of one or more fillable form fields established in advance of presentment of the set of selectable fillable form fields,
    presenting the one or more of the plurality of fillable electronic forms, wherein each of the one or more plurality of fillable electronic forms are presented in entirety;
    receiving a user response for populating one or more fillable form fields from the curated list of one or more fillable form fields of the set of selectable fillable form fields;

striping the user response as an identical response to be automatically deployed in at least a second fillable electronic form;

automatically deploying the user response in at least a second fillable electronic form from the one or more of the plurality of fillable electronic forms, the at least a second fillable electronic form having one or more fillable form fields shared in common with the one or more fillable form fields from the curated list of one or more fillable form fields of the set of selectable fillable form fields, in response to the request to select the one or more of the plurality of fillable electronic forms, present multiple fillable electronic forms separately fillable from one another and separately fillable from the set of selectable fillable form fields, wherein the identical response selectively striped across the one or more fillable form fields, the set of selectable fillable form fields, and the multiple fillable electronic forms.

7. The method of claim 6, further comprising:
generating a field prompt to present the one or more fillable fields.

8. The method of claim 6, further comprising:
generating a field panel to present the one or more fillable fields.

9. The method of claim 6, further comprising:
receiving another user response for populating one or more fillable form fields from the one or more of the plurality of fillable electronic forms.

10. The method of claim 6, wherein the various form documents comprise a blank form document as input by any user, a captured image thereof, a digitally recreated form document, necessary accompanying documents for any of the various form documents, or a completed form document.

11. A non-transitory computer readable medium storing instructions executable by at least one processing device, the instructions including instructions to:

automatically import, over a network, one or more of the plurality of fillable electronic forms which correspond to various form documents from the at least one database;

receive, at a user interface component via the network, a request to select the one or more of the plurality of fillable electronic forms;

present a set of selectable fillable form fields, wherein the set of selectable fillable form fields comprises a curated list of one or more fillable form fields which originate from the one or more of the plurality of fillable electronic forms that correspond to the various form documents, the curated list of one or more fillable form fields established in advance of presentment of the set of selectable fillable form fields;

present the one or more of the plurality of fillable electronic forms, wherein each of the one or more plurality of fillable electronic forms are presented in entirety;

receive a user response for populating one or more fillable form fields from the curated list of one or more fillable form fields of the set of selectable fillable form fields;

stripe the user response as an identical response to be automatically deployed in at least a second fillable electronic form;

automatically deploy the user response in at least a second fillable electronic form from the one or more of the plurality of fillable electronic forms, the at least a second fillable electronic form having one or more fillable form fields shared in common with the one or more fillable form fields from the curated list of one or more fillable form fields of the set of selectable fillable form fields in response to the request to select the one or more of the plurality of fillable electronic forms, present multiple fillable electronic forms separately fillable from one another and separately fillable from the set of selectable fillable form fields, wherein the identical response selectively striped across the one or more fillable form fields, the set of selectable fillable form fields, and the multiple fillable electronic forms.

12. The system of claim 11, wherein in response to the selection of the one or more fillable fields comprises generating a field prompt to present the one or more fillable fields.

13. The system of claim 12, wherein, in response to the selection of the one or more fillable fields comprises generating a field panel to present the one or more fillable fields.

14. The system of claim 13, further comprising:
receive another user response for populating one or more fillable form fields from the one or more of the plurality of fillable electronic forms.

15. The system of claim 11, wherein the various form documents comprise a blank form document as input by any user, a captured image thereof, a digitally recreated form document, necessary accompanying documents for any of the various form documents, or a completed form document.

* * * * *